Nov. 4, 1969  G. CLOSE  3,476,215
GROCERY STORE CHECKSTAND
Filed Nov. 8, 1967  2 Sheets-Sheet 1
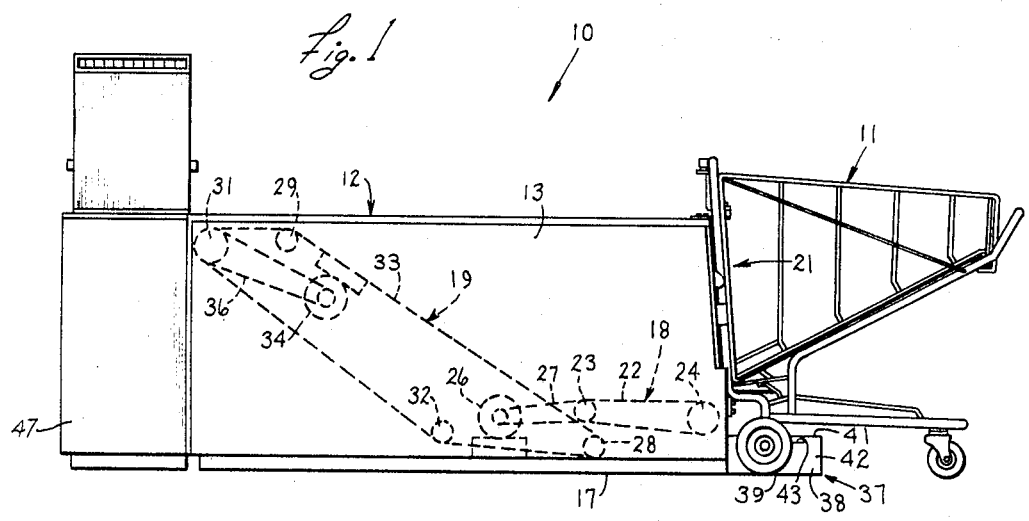
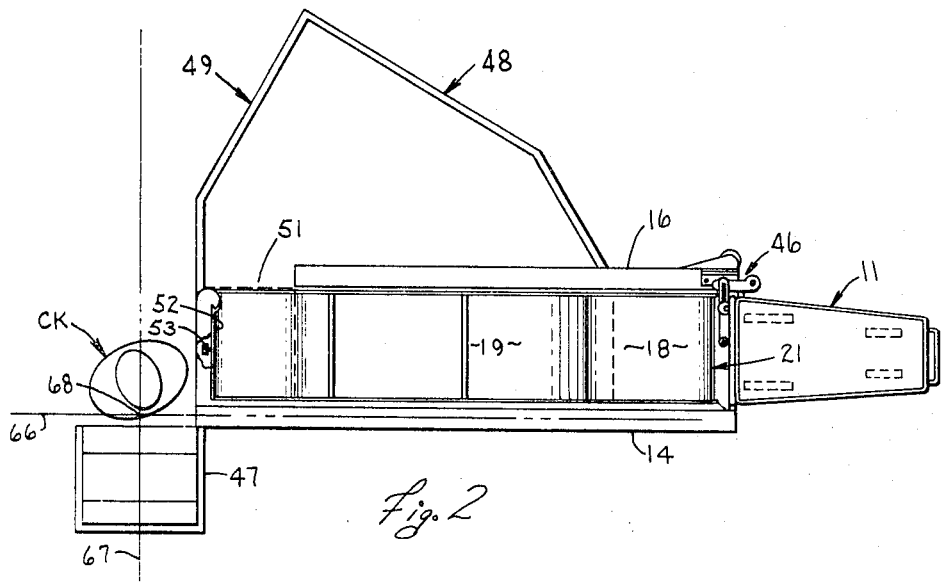
INVENTOR.
GARTH CLOSE
BY
Woodhams, Blanchard & Flynn
ATTORNEYS INVENTOR.
GARTH CLOSE
BY
Woodhams, Blanchard & Flynn
ATTORNEYS

United States Patent Office 3,476,215
Patented Nov. 4, 1969

3,476,215
GROCERY STORE CHECKSTAND
Garth Close, Lubbock, Tex., assignor to United Steel and Wire Company, Battle Creek, Mich., a corporation of Michigan
Filed Nov. 8, 1967, Ser. No. 681,521
Int. Cl. B62d; B60k; B60l
U.S. Cl. 186—1
9 Claims

ABSTRACT OF THE DISCLOSURE

A supermarket checkstand for automatically unloading merchandise from a cart having a counter with a substantially depressed zone open at a first location and having a conveyor disposed within the depressed zone, and extending from said first location to a second location. Means are included for driving said conveyor from said first location toward said second location. A merchandise storage area is positioned at a third location transversely offset from, and generally coextensive with, the conveyor between the first and second locations. A support for a summing device is positioned adjacent one corner of the checkstand and a bagging area is spaced from said support position adjacent the merchandise storage area to define an area for the summing device operator therebetween whereby said operator is in alignment with said conveyor. The checkstand has means for automatically stopping the conveyor after the merchandise has moved thereon from said first position to said second position adjacent said area for said summing device operator.

Cross reference to related applications

Ser. No. 609,798, filed Jan. 17, 1967; Ser. No. 609,930, filed Jan. 17, 1967.

Field of the invention

This invention relates to an automatic shopping cart unloading system and, more particularly, relates to an improvement in a checkstand for automatically unloading shopping carts.

Description of the prior art

It has long been recognized in the operation of retail establishments of the supermarket type that an important factor of profitable operation is the easy and rapid flow of both merchandise and customers therethrough. Accordingly, great efforts have in the past been made to promote such ease and rapidity of flow. Much of the equipment supplied for such retail establishments and, in fact, much of the design of such establishments themselves have been directed toward this end. However, a serious bottleneck has in many cases continued to exist at the check-out stands and this has been the source of frequent and often irritating delays for the customer. Accordingly, equipment which will tend to speed the flow of customers and merchandise past the check-out counter will be advantageous.

Most of the equipment which has been designed to speed the flow of customer and merchandise past the checkstands has involved the use of apparatus for aiding the customer in removing the merchandise from the shopping cart. This has involved the use of conveyor mechanisms mounted on the bottom of the basket of the shopping cart so that when the cart is engaged with the end of a checkstand and the conveyor activated, the goods within the cart will be bodily transported through a gate system on the cart to the counter so that it may be checked by the cashier. Similar systems utilize a plow or the like mounted at the rear of the cart and has a plurality of cables or straps attached thereto and extending forwardly therefrom so that when the straps are pulled forwardly, the plow will push the goods in the cart out through a gate onto the counter enabling the cashier to check same. Still others have lifted the cart bodily to dump the goods onto the checkstand. However, the systems discussed above and those similar thereto involve a rather intricate and complicated shopping cart structure and/or associated mechanism which is expensive to manufacture and is still not entirely satisfactory in operation. The cart structures in some of these tend to be too heavy and, therefore, too difficult to be moved by the average shopper and others are too likely to damage the articles carried therein to be acceptable.

Stated in another manner, the equipment discussed hereinabove has been developed in an attempt to lessen the "waste of time" of waiting in line. The thought behind most of the aforesaid developments has been to minimize or eliminate the task for the customer of removing the goods from the cart, the expectation being that it will be much faster to remove the goods from the cart mechanically than by hand. However, time is still "wasted" in the checking procedure in having to wait for the merchandise to arrive at the check point from the cart, due to the slowness with which the mechanism operates for unloading the cart. Further, the speed of the checking process is hampered by the fact that the storage area for storing the checked merchandise before it is bagged is in alignment with the conveyor carrying the merchandise past the checkstand operator. The conveyor travels at such a rate that it is necessary for the checkstand operator to wait until the previous customer has been completely checked out and the merchandise bagged so that the merchandise storage area is cleared before checking the merchandise of the next customer.

In the checkstand disclosed in the copending application of Harold J. Ruttenberg and myself, Ser. No. 609,798, filed Jan. 17, 1967, as well as in the majority of presently common checkstands, the checkstand operator is positioned midway between the ends thereof, said ends of said checkstand respectively locating the merchandise receiving zone and the bagging zone. A summing device is positioned closely adjacent the operator's position. Thus, as an operator stands with respect to the summing device, the area which must be surveyed by the operator to make sure that the merchandise is flowing smoothly oftentimes exceeds 180 degrees.

Furthermore, the transfer of merchandise on the conveyor system does not always occur smoothly due to odd shaped containers which slide or roll with respect to the movement thereof. Thus, one of the areas which must be surveyed by the operator is the conveyor belt to see that merchandise is being transferred smoothly thereon. However, in the checkstand illustrated in the aforesaid application Ser. No. 609,798, it is often necessary for the operator to virtually lean over the walls of the checkstand to check the transfer of merchandise moving close to the walls on the conveyor system. Accordingly, equipment which will ease the checkstand operator's task of matching merchandise on the conveyor will be advantageous.

Furthermore, and as is discussed in my copending application, Ser. No. 634,358, filed Apr. 27, 1967, a problem exists in inspecting the bottom tray of shopping carts. Known systems for checking merchandise in a supermarket often require that the checkstand operator lean over the counter to inspect the bottom tray of the shopping cart. Accordingly, equipment which will ease the checkstand operator's task in inspecting the bottom tray of shopping carts will be likewise advantageous.

Accordingly, the objects of this invention are:

(1) To provide apparatus for use in retail establishments of the supermarket type which will tend to increase the speed and convenience of flow of both customers and merchandise therethrough.

(2) To provide apparatus, as aforesaid, which will tend to increase the rate of flow of customers and merchandise through the check-out portion of such establishments.

(3) To provide apparatus, as aforesaid, which will both assist and tend to urge the rapid unloading of shopping carts at the check-out portion of such retail establishments.

(4) To provide apparatus, as aforesaid, which will be of sufficiently simple design that its manner of operation will be obvious to users thereof whereby even the most nonmechanical shopper can use same effectively, either without instructions or in pursuance of only the most simple of verbal instructions which can be given by the cashier at the checkstand.

(5) To provide apparatus, as aforesaid, for automatically unloading a shopping cart thereby eliminating the need for a customer to remove the goods from the shopping cart so that the customer may watch the cashier check the merchandise to catch any errors that the cashier might make.

(6) To provide apparatus, as aforesaid, which will lessen the "waste of time" of waiting in line at a checkstand.

(7) To provide apparatus, as aforesaid, which will reduce the area which must be surveyed by a checkstand operator to an arc less than 180 degrees.

(8) To provide apparatus, as aforesaid, which will ease the checkstand operator's task in surveying the conveyor system to make sure that the merchandise is being transferred smoothly thereon.

(9) To provide apparatus, as aforesaid, which will permit an easy inspection of the bottom tray of shopping carts.

Other objects and purposes of this invention will be apparent to persons acquainted with apparatus of this general type upon reading the following specification and inspecting the accompanying drawings.

Brief description of the drawings

FIGURE 1 is a side elevational view of a checkstand embodying the invention having a cart engaged therewith which is to be unloaded.

FIGURE 2 is a top view of the checkstand and cart.

Figure 4:
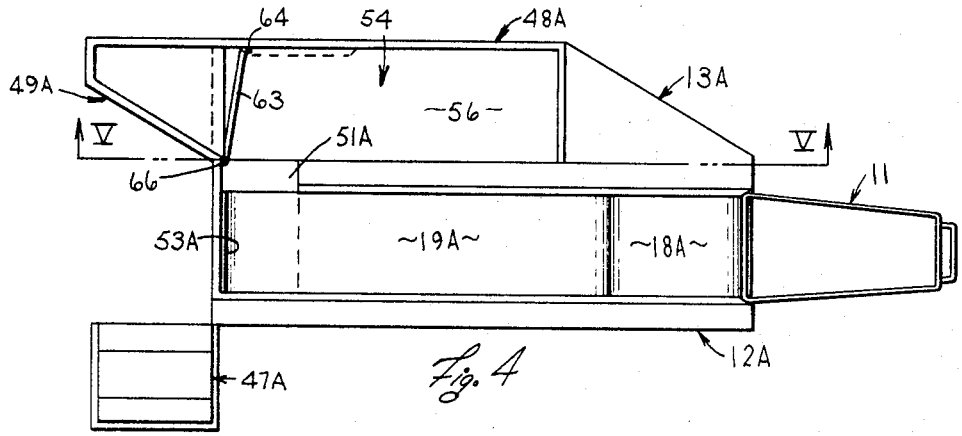
FIGURE 4 is a top view of a modified checkstand.

Certain terminology will be used in the following description for convenience in reference only and will not be limiting. The words "upwardly" and "downwardly," "rightwardly" and "leftwardly" will designate directions in the drawings to which reference is made. The words "forwardly' and "rearwardly" will refer to directions to the left and to the right, respectively, of the checkstand and cart illustrated in the drawings. The words "inwardly" and "outwardly" will refer to directions toward and away from, respectively, the geometric center of the device and designated parts thereof. Said terminology will include the words above specifically mentioned, derivatives thereof and words of similar import.

Summary of the invention

In general, the objects and purposes of the invention have been met by providing a checkstand having a substantially depressed zone therein and open at one end and a conveyor system disposed in the depressed zone. The counter is further provided with a support for a summing device, or computer, positioned at the other end of the checkstand adjacent one corner thereof. A merchandise storage area for storing the checked merchandise is located adjacent the other corner of said other end, is spaced from said summing device support and extends generally coextensive with the aforesaid conveyor system between the open end and the other end. The space between the summing device support and the merchandise storage area defines an area for the summing device operator who is thereby also positioned in longitudinal alignment with the conveyor.

Detailed description

This invention is an improvement over the checkstand set forth in copending joint application of myself and Harold J. Ruttenberg, Ser. No. 609,798, filed Jan. 17, 1967 and assigned to the same assignee as the present application.

In its narrower aspects, the subject matter of the present invention has been designed for use with a cart set forth in the aforesaid copending application, Ser. No. 609,798. Particularly, said narrower aspects of the invention are directed toward a check-out counter embodying the invention as utilized in such environment and in a combination with a cart set forth in said application. In its broader aspects, however, the subject matter of the present invention is applicable for use with other check-out counters and with other carts and it will, accordingly, be recognized that insofar as such broader aspects are concerned, the use herein of the particular checkstand of said application is illustrative only and not limiting.

An automatic cart unloading system is illustrated in FIGURE 1 and is generally referred to by the reference numeral 10. The system comprises a shopping cart 11 (schematically illustrated) capable of being unloaded automatically and a checkstand 12 which is provided with means for opening a gate on the shopping car to permit same to unload automatically.

Figure 3:
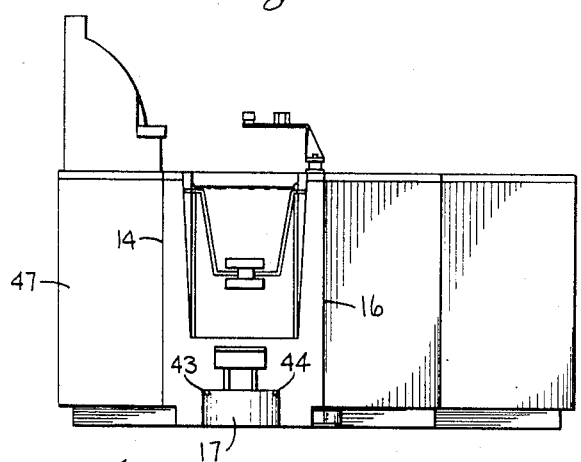
FIGURE 3 is an end view of the checkstand.

The checkstand 12 is essentially identical in most respects to the checkstand set forth in the aforesaid copending application, Ser. No. 609,798, and reference is made thereto for the details of such checkstand. Briefly, however, the checkstand 12 comprises a longitudinally extending counter 13, having a depression therein, U-shaped in transverse section, which is defined by a pair of vertical sidewalls 14 and 16 (FIGURE 3) and an interconnecting bottom wall 17. A pair of conveyors 18 and 19 are disposed within the counter 13 between the sidewalls 14 and 16. The first conveyor 18 is disposed adjacent the open right end 21 and comprises an endless belt supported on rollers 23 and 24. The upper reach of the belt 22 is preferably positioned so that it runs close to and parallel to the bottom wall 17. It is recognized that the upper reach of the conveyor may be inclined with respect to the bottom wall 17 as desired to facilitates better handling of merchandise. The conveyor belt 22 is driven counterclockwise (FIGURE 1) by any convenient means, such as a motor and gear reducer 26 connected by a chain 27 to the roller 23 of said conveyor.

The conveyor 19 is positioned leftwardly of the conveyor 18 so that the rightwardmost roller 28 thereof is disposed beneath the roller 23 of the conveyor 18. A roller 29 is positioned adjacent the upper edge of the walls 14 and 16 and a third roller 31 is disposed adjacent the left end of the counter 13 and slightly below the horizontal plane in which the roller 29 lies. A fourth roller 32 is disposed below the rollers 29 and 31 and between the rollers 28 and 29.

An endless conveyor belt 33 is supported by the rollers 28, 29, 31 and 32. Since the roller 29 is positioned above and to the left of the roller 28 (FIGURE 1), the belt 33 is inclined upwardly to the left. A motor and gear reducer 34 is secured by a chain 36 to the shaft of the roller 31 to drive same counterclockwise. It is recognized that the length of the conveyor 19 may be altered to accommodate any other method for moving merchandise past the cashier at the checkstand.

A cart-holding device 37 is secured to the right end of the counter 13 adjacent the open right end 21. The cart-holding device comprises a housing 38 which has a bottom wall 39, a top wall 41 and a curved vertical wall 42. The vertical wall 42 contains a pair of slots 43 and 44 through which project a pair of arms (not shown) to hold the cart 11 against the open right end 21 of the counter 13.

If desired, the checkstand 12 may be provided with a cart removal device 46 for removing the cart 11 from the open right end 21 of the counter 13. Such a structure is set forth in my copending application Ser. No. 609,930, filed on Jan. 17, 1967.

A support 47 for supporting a computer, calculator, cash register or other type of summing device is positioned at the left end of the counter 13 and adjacent one corner thereof. A merchandise storage area 48 is transversely offset from and extends generally coextensive with the path of the conveyors 18 and 19 between the right and left ends thereof. In this particular embodiment, the support 47 and merchandise storage area are located on opposite sides of the center line of the conveyor 19. A bagging area 49 is located adjacent the merchandise storage area 48. A line 66 (FIGURE 2) extends generally parallel to the conveyor 19 and extends beyond the left end of the counter 13. A second line 67 extends perpendicular to the line 66 and is preferably located adjacent the left end of the counter as illustrated in FIGURE 2. The perpendicularly intersecting lines 66 and 67 define an origin 68. The origin 68 defines the approximate location of the checkstand operator CK. It is recognized, of course, that the exact position of the checkstand operator cannot be precisely defined. However, as a practical matter, the origin 68 adequately defines the approximate position of the checkstand operator CK while operating the summing device. In this particular embodiment, the checkstand 12 lies within a 90 degree quadrant defined by the intersecting lines. The checkstand operator in this embodiment, is positioned between the bagging area and the support 47. A passageway 51 is provided in the wall 16 adjacent the left end thereof which provides an access from the upper reach of the conveyor 19 to the merchandise storage area 48. The center line of the passageway is preferably perpendicular to the center line of the conveyors 18 and 19.

Since the checkstand operator CK is preferably positioned in alignment with the conveyors 18 and 19, it is possible for the operator to check the flow of merchandise on the conveyor belts 22 and 33 and can easily detect merchandise which is not being transferred smoothly thereon. Furthermore, it is possible for the operator to look down through the depressed zone in the counter 13 through the open end 21 therein and inspect the bottom tray of the cart. Thus, the situation where the checker must lean over the counter to inspect the transfer of merchandise on the conveyor belts close to the walls of the checkstand as well as inspect the bottom tray of the shopping cart is essentialy eiminated.

The left end of the counter 13 is provided with a mechanism for halting the operation of the motor and gear reducers 26 and 34 to stop the movement of the conveyors 18 and 19 when the merchandise thereon reaches the left end of conveyor 19. More particularly, an elongated arm 52 (FIGURE 2) is positioned transversely of the conveyor 19 adjacent the left end thereof and is closely spaced thereabove. A switch member 53 is positioned, in this embodiment, to the left of the elongated arm 52 and is situated so that it is operated by a leftward movement of the elongated arm 52.

If desired, a gate (not shown) can be positioned within the storage area 47 to appropriately separate the merchandise of one customer from the merchandise of the next customer while the next customer's merchandise is being checked by the checker CK and the previous customer's merchandise is being bagged.

Alternate construction

The checkstand 12A (FIGURE 4) is in many respects identical to the checkstand 12 discussed hereinabove. Therefore, the parts of the modified checkstand 12A which are so identical will be referred to by the same reference numerals to designate corresponding parts of the checkstand, but with the suffix A added thereto, and need no further description. Hence, only the parts which are different will be described.

In this particular embodiment, the merchandise storage area 48A includes a conveyor 54 having an endless belt 56 supported on rollers 57 and 58. A motor and gear reducer 59 is secured by a belt or chain 61 to the shaft of the roller 57 to drive same. The conveyor 54 is operable in two directions, that is, the upper reach 62 of the belt 56 is movable to the left and to the right (FIGURES 4 and 5) by appropriate switching of the power to the motor and gear reducer 59.

In this particular embodiment the path of the endless belt 56 is parallel to the path of the conveyors 18A and 19A on the counter 13A so as to minimize the space occupied by the checkstand again. The space between the computer or cash register support 47A and the bagging area 49A defines an area for the computer operator or cashier CK.

If desired, a gate 63 may be placed transversely of the conveyor belt 56 and hinged at 64 to a sidewall of the counter 13A. The gate 63 can be positioned so that it can be locked in a position indicated at 66. It also can be made to pivot about the hinge 64 (when the lock 66 is disengaged) in a direction dependent upon the direction of movement of the conveyor 54. That is, a leftward movement of the conveyor 54 will cause the gate 63 to pivot clockwise (FIGURE 4), due to the frictional engagement therewith, to the solid line position. Other apparatus (not shown) could also be utilized to hold the gate 63 in the dotted line position until all of the merchandise located on the belt 56 is to the left of the pivot 64 after which time the apparatus could be made to release the gate and permit same to move clockwise.

Operation

Although the operation of the device embodying the invention has been indicated somewhat above, said operation will be described in detail hereinbelow for a better understanding of the invention.

The cart 11 can be firmly secured to the open right end 21 of the counter 13 by any convenient means such as arms projecting through the slots 43 and 44. The checker CK can then give the command to have the cart unloaded by the appropriate apparatus discussed in the aforementioned application Ser. No. 609,798. The same command can also start the conveyors 18 and 19 so that when the merchandise in the cart contacts said conveyors, it will be moved from the open end 21 of the counter 13 toward the left end thereof. The conveyors 18 and 19 will stop when the merchandise on conveyor 19 reaches the left end and contacts the elongated arm 52. Since the elongate arm is positioned slightly above the conveyor belt 33, the merchandise thereon will strike the elongated arm and cause it to move leftwardly to actuate the switch member 53 to stop the conveyors 18 and 19. The checkstand operator CK can check the merchandise by manually moving each item through the passageway 51 into the merchandise storage area 48. At the completion of the checking task, the checker CK can, if desired, move to the bagging area 49 and be in the process of putting the merchandise in the merchandise storage area 48 into paper bags while the merchandise in the cart of the next customer is being unloaded from said cart onto the conveyors 18 and 19 and moved toward the left end of the counter.

Figure 5:
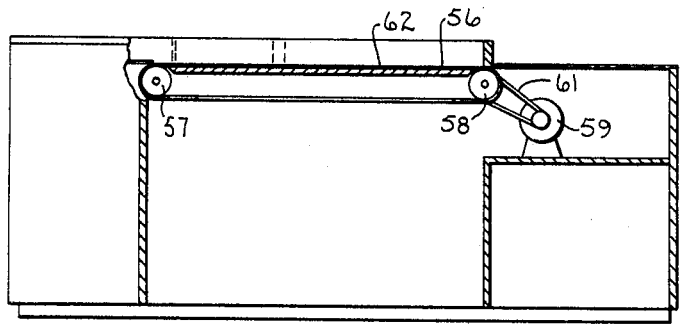
FIGURE 5 is a sectional view taken along the line V—V of FIGURE 4.

Referring to FIGURE 4, while the cashier CK is checking the merchandise presently positioned on the conveyor 19A, the conveyor belt 56 of the conveyor mechanism 52 is moving in a direction toward the right end of the counter 13A. When the merchandise from said customer's cart has been completely checked and ready to be bagged, the cashier can, by merely reversing the direction of the conveyor belt 56, move the merchandise thereon toward the left end of the counter 13A and the bagging area 49A. Thus, while the cashier CK is putting the merchandise in paper bags, the next customer can then have the cart unloaded onto the conveyors 18A and 19A and transported thereby to the left end of the counter 13A until the switch member 53A is activated by the merchandise striking the elongated arm 52 and stopped. When the merchandise of the previous customer has been completely bagged and the transaction completed, the merchandise for the next customer is positioned adjacent the left end and is ready to be checked at the completion of the transaction with the previous customer. Thus, utilization of this type of checkstand will lessen the "waste of time" of waiting in line at the check-out counter.

Once the bagging task has been completed, the cashier CK can then move from the bagging area back to a position adjacent the left end of the conveyor 19 and the summing device support 47. It is recognized, of course, that on high volume days the checker CK usually has a person assigned to a particular checkstand to do only bagging. In these instances, it may be desirable to use the gate 63 to hold the previously check merchandise against the left end of the storage area 48 at the time the upper reach 62 thereof is moving rightwardly. Thus, the cashier can then immediately begin checking the merchandise for the next customer prior to the completion of the bagging of the previous customer's merchandise since the checked merchandise will move rightwardly on the conveyor 54. When the bagger has completed the bagging task for the previous customer, the gate 63 can be moved to the dotted line position in FIGURE 4 and the conveyor 54 can be reversed so that the upper reach 62 thereof moves leftwardly to bring the merchandise located thereon to the bagging area 49A.

After the merchandise in the cart has been unloaded, the cart may be then moved from the open end 21 of the counter 13 by the cart control device 46 in a manner set forth in my copending application Ser. No. 609,930.

The embodiments of the invention in which an exclusive property or privilege is claimed are defined as follows:

1. A supermarket checkstand system for automatically unloading merchandise from a cart, comprising:
   a counter having a substantially depressed zone open at a first location;
   conveying means extending between said first location and a second location and disposed in said depressed zone, one end of said conveying means being located at said first location and positioned to receive said merchandise from said cart;
   driving means for driving said conveying means from said first location toward said second location to move said merchandise carried thereon from said first location to said second location;
   a merchandise storage area at a third location transversely offset from, and at least partially coextensive with, said conveying means between said first and second locations; and
   a support for a summing device positioned on one side of said counter adjacent one longitudinal end thereof, said mechandise storage area being spaced therefrom on the opposite side of said counter to define an area longitudinally aligned with said counter for a summing device operator.

2. A checkstand defined in claim 1, wherein said support for a summing device and said merchandise storage area are located on opposite sides of the center line of said conveying means, whereby said operator will be located substantially in longitudinal alignment with said conveying means and can thereby easily maintain visual surveillance of said conveying means.

3. A checkstand defined in claim 1, including means for automatically stopping said conveying means after said merchandise has moved from said first location to said second location.

4. A checkstand defined in claim 3, wherein said means for automatically stopping said conveying means comprises an elongated arm extending transversely of and spaced closely above said conveying means, said arm being connected to switching means which becomes actuated when said merchandise on said conveying means strikes said elongated arm.

5. A checkstand defined in claim 1, wherein said transversely offset merchandise storage area includes further conveying means.

6. A checkstand defined in claim 5, wherein said further conveying means extends generally parallel to said first-mentioned conveying means.

7. A checkstand defined in claim 5, wherein said further conveying means comprises an endless belt and drive means, said drive means being operably connected to said endless belt to drive said belt in two directions.

8. In a checkstand system, the combination comprising:
   an elongated base;
   a merchandise conveying system extending longitudinally of said base for conveying merchandise longitudinally of said base from one end to the other end;
   a summing device positioned at said other end of said base and operable from a position longitudinally aligned with said base, said position defining the origin of a 90 degree quadrant of which one leg lies parallel with the center line of said conveyor system and the reciprocal of the other leg intersects said summing device;
   means defining a merchandise storage area transversely offset from, and at least partially coextensive with, said conveying system between the longitudinal ends of said base and lying within said 90 degree quadrant.

9. The device of claim 8 wherein said one leg lies within said base.

References Cited
UNITED STATES PATENTS
| | | | |
|---|---|---|---|
| 3,109,515 | 11/1963 | Schild | 186—1 |
| 3,245,498 | 4/1966 | Stanley | 186—1 |

FOREIGN PATENTS
| | | |
|---|---|---|
| 634,929 | 7/1963 | Belgium. |
| 1,420,850 | 11/1965 | France. |
| 1,058,734 | 2/1967 | Great Britain. |

EVON C. BLUNK, Primary Examiner

H. C. HORNSBY, Assistant Examiner